United States Patent
Donderici et al.

(10) Patent No.: US 9,562,985 B2
(45) Date of Patent: Feb. 7, 2017

(54) ACOUSTIC SENSOR APPARATUS, SYSTEMS, AND METHODS

(75) Inventors: Burkay Donderici, Houston, TX (US); Baris Guner, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 25 days.

(21) Appl. No.: 14/241,039

(22) PCT Filed: Sep. 26, 2011

(86) PCT No.: PCT/US2011/053295
§ 371 (c)(1),
(2), (4) Date: Feb. 25, 2014

(87) PCT Pub. No.: WO2013/048366
PCT Pub. Date: Apr. 4, 2013

(65) Prior Publication Data
US 2014/0222344 A1    Aug. 7, 2014

(51) Int. Cl.
| G01V 1/40 | (2006.01) |
| G01V 1/46 | (2006.01) |
| G01V 1/44 | (2006.01) |

(52) U.S. Cl.
CPC .. *G01V 1/46* (2013.01); *G01V 1/44* (2013.01)

(58) Field of Classification Search
CPC .................................. G01V 1/46; G01V 1/44
USPC ........................................................ 702/11
See application file for complete search history.

(56) References Cited

U.S. PATENT DOCUMENTS

| 4,117,074 A | 9/1978 | Tiersten et al. | |
| 5,394,377 A * | 2/1995 | vonBieren | G01H 9/004 250/227.14 |
| 6,588,267 B1 * | 7/2003 | Bradley | G01V 1/523 181/102 |
| 6,837,332 B1 * | 1/2005 | Rodney | G01V 1/48 181/0.5 |

(Continued)

FOREIGN PATENT DOCUMENTS

WO    WO-2013048366 A1    4/2013

OTHER PUBLICATIONS

Chen et al, "High performance chitosan diaphragm-based fiber-optic acoustic sensor", Jun. 30, 2010, Sensors and Actuators A: Physical 163(2010) 42-47.*

(Continued)

*Primary Examiner* — John Breene
*Assistant Examiner* — Stephanie Bloss
(74) *Attorney, Agent, or Firm* — Gilliam IP PLLC

(57) ABSTRACT

In some embodiments, an apparatus and a system, as well as a method and an article, may operate to acquire multiple output values provided by at least one elongated, unitary acoustic sensor operating as a secondary propagation medium. The sensor has multiple mechanical-to-electrical conversion probe points along its length, to provide corresponding multiple output values proportional to mechanical movement along the length of the sensor, the mechanical movement being induced by acoustic waves in a primary propagation medium comprising a geological formation and borehole fluid. Further activity may include processing the output values to determine slowness in an acoustic wave propagating between at least two of the probe points. Additional apparatus, systems, and methods are disclosed.

20 Claims, 10 Drawing Sheets

(56) References Cited

U.S. PATENT DOCUMENTS

| | | | |
|---|---|---|---|
| 6,937,736 B2 | 8/2005 | Toda | |
| 7,037,268 B1* | 5/2006 | Sleva | B06B 1/0688 340/855.6 |
| 7,698,066 B2 | 4/2010 | Huang et al. | |
| 7,764,572 B2* | 7/2010 | Wu | G01V 1/44 181/102 |
| 2005/0034917 A1* | 2/2005 | Mathiszik | G01V 1/44 181/108 |
| 2010/0284247 A1* | 11/2010 | Manning | G01V 1/48 367/28 |

OTHER PUBLICATIONS

"International Application Serial No. PCT/US2011/053295, International Preliminary Report on Patentability mailed Jan. 31, 2014", 9 pgs.
"International Application Serial No. PCT/US2011/053295, Search Report mailed Jan. 20, 2012", 2 pgs.
"International Application Serial No. PCT/US2011/053295, Written Opinion mailed Jan. 20, 2012", 6 pgs.
Kimball, C V, et al., "Semblance processing of borehole acoustic array data", Geophysics, 49(3), (Mar. 1984), 274-81.
"Australian Application Serial No. 2011378266, First Examiner Report mailed Jun. 26, 2014", 3 pgs.
"Brazilian Application Serial No. BR1120140071608, Amendment filed Jul. 23, 2014", 12 pgs.
"International Application Serial No. PCT/US2011/053295, Response filed Apr. 9, 2012 to Written Opinion mailed Jan. 20, 2012", 3 pgs.
McFadden, P. L., et al., "The $N$th-root stack: Theory, applications, and examples", Geophysics, 51(10), (1986), 1879-1892.
Nolte, Bertram, et al., "Dispersion Analysis of Split Flexural Waves", Earth Resources Laboratory Industry Consortia Annual Report;1997-15, (1997), 1-28.
"Mexican Application Serial No. MX/a/2014/003634, Office Action mailed Jan. 28, 2015", 3 pgs.
"Canadian Application Serial No. 2,848,956, Office Action mailed Jul. 20, 2015", 3 pgs.
"European Application Serial No. 11873485.4, Extended European Search Report mailed Jan. 5, 2016", 4 pgs.

* cited by examiner

ACOUSTIC SENSOR APPARATUS, SYSTEMS, AND METHODS

PRIORITY APPLICATION

This application is a U.S. National Stage Filing under 35 U.S.C. 371 from International Application Number PCT/US2011/053295, filed on 26 Sep. 2011, and published as WO 2013/048366 A1 on 4 Apr. 2013, which application and publication are incorporated herein by reference in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, logging tools of the acoustic type are often used to provide information that is directly related to geo-mechanical properties.

Traditional acoustic tools utilize transmitters to create pressure waves inside the borehole fluid, which in turn create several types of waveguide modes in the borehole. Corresponding modes of propagation occur in the formation surrounding the borehole, and each of these can be used to provide information about formation properties. Thus, once data associated with the various modes is acquired, it can be processed to determine formation properties, such as compression and shear wave velocity in the formation. For this reason, acoustic tools are an integral part of modern geophysical surveys, providing information on the mechanical properties of the medium by measuring acoustic modes of propagation.

Conventional acoustic tools rely on discrete, mechanically independent sets of receivers, where one electrical measurement is made per moving part (e.g., per receiving transducer). Since acoustic systems transform the signal from the spatial domain to the velocity domain, the spatial separation between individual sensors determines the maximum unambiguous velocity that can be measured, as dictated by the Nyquist-Shannon sampling theorem.

In these conventional tools, at least two difficulties arise. First, velocity measurement becomes non-unique, due to aliases observed in both time and frequency analysis. Second, signals arriving at different sensors are related to each other in a non-trivial way. Relatively complicated analysis methods, such as semblance processing, are used in an attempt to deconstruct relationships between them.

Although these difficulties can be reduced somewhat by using more sensors, and spacing them more closely together, this approach may be difficult to realize due to mechanical constraints, and increased overall cost.

DETAILED DESCRIPTION

To address some of the challenges described above, as well as others, apparatus, systems, and methods for acquiring acoustic waveform information with a unitary, elongated sensor are described. An arbitrary number of waveform probe points are used to acquire a corresponding number of sample data points along the length of the sensor. This mechanism permits accurate determination of formation properties without resorting to a multitude of individual sensors, reducing acoustic tool construction costs and, when certain signal transformation techniques are applied, semblance processing can also be simplified.

For the purposes of this document, a "unitary" sensor means a single, undivided sensor that is capable of carrying an acoustic wave along its length in an uninterrupted fashion. An example of such a sensor is a single piece of piezoelectric material, formed in the shape of a rectangular bar.

For example, some embodiments include an acoustic sensor that permits making multiple simultaneous measurements along a single, continuous slab of material. The sensor may comprise piezoelectric material and/or other materials, since it may be useful to attach other structures to the continuously-formed pad of the sensor, perhaps to enhance the magnitude or decoupling of the measured signals. Mechanical displacements created along the material length due to the reception of sonic waves are converted to electrical voltages or currents, which can be measured at a number of points along the sensor. Due to the electrical nature of this measurement, a large number of points can be used, for example by attaching a linear array of closely-spaced wires to the material, via probe points.

Because the sensor is composed of a single piece which acts as a secondary propagation medium for acoustic waves (with the formation and fluid in the borehole acting as the primary medium), the measured displacement voltage/current values are coupled through the sensor body. Removal of the sensor body effects can be accomplished using an inversion algorithm. Fine spatial sampling, which is not available with conventional sensors, permits the use of a simple and efficient processing technique to determine the velocity of impinging acoustic waves.

In summary, the use of various embodiments helps: (i) reduce or eliminate aliasing, which allows high frequency operation; (ii) obtain a velocity profile of the formation in the radial direction; (iii) determine velocities in different layers and layer boundaries; (iv) reduce sensor costs; and (v) increase the efficiency and accuracy of signal analysis. Various example embodiments that can provide some or all of these advantages will now be described in detail.

Figure 1:
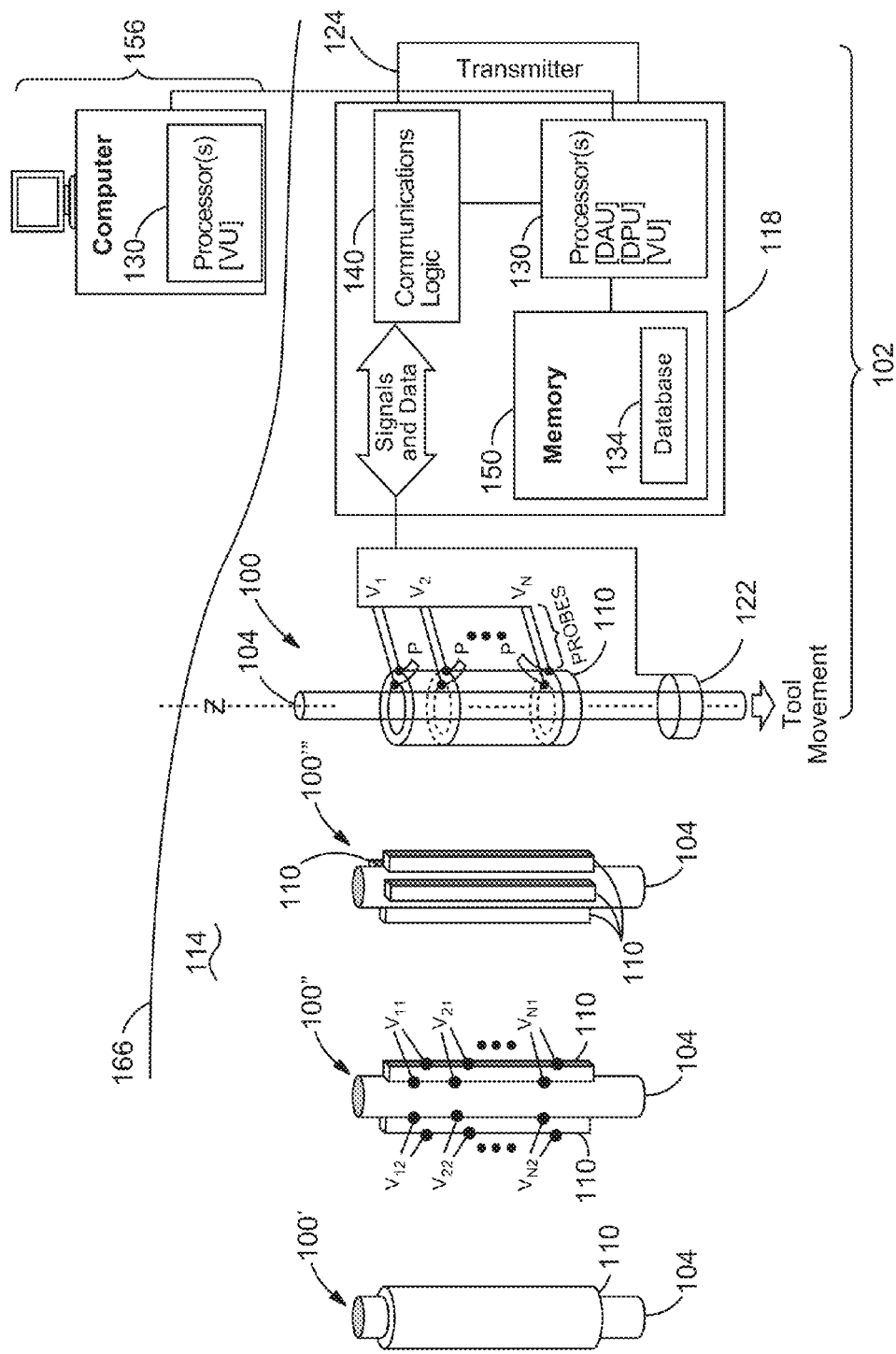
FIG. 1 is a block diagram of apparatus and systems according to various embodiments of the invention.

FIG. 1 is a block diagram of apparatus 100 and systems 102 according to various embodiments of the invention. In many embodiments, the apparatus 100 comprises at least one elongated, unitary acoustic sensor 110 to operate as a secondary propagation medium, with multiple mechanical-to-electrical conversion probe points P along the length of the sensor 110. These probe points P provide corresponding multiple output values (e.g., current or voltage values $V_1$, $V_2, \ldots V_N$) proportional to mechanical movement along the length of the sensor 110. The mechanical movement is generally, or at least in part, induced by acoustic waves traveling in the primary propagation medium, such as a formation 114, and the fluid in the borehole. The fluid may comprise drilling fluid (e.g., mud) or other types of fluid that operate to conduct acoustic waves to the secondary propagation medium.

The apparatus 100 may further comprise one or more processors 130, located inside and/or outside a housing 104, such as a down hole tool, or a wireline tool body. The processors 130 may be configured to process the output values from the sensor 110, to determine slowness in an acoustic wave propagating between at least two of the probe points P along the length of the sensor 110. Thus, the processors 130 can operate to determine the slowness of the propagating acoustic wave from the output values of the sensor 110.

A system 102 may comprise one or more apparatus 100 and a control center 118 that manages the operation of the apparatus 100, to acquire and process received signal waveforms. Although a single transmitter unit 122 is shown, the methodologies described herein can easily be applied to multiple transmitters. Transmitters with multiple excitation points per moving part (not shown) may be used in conjunction with one or more unitary sensors 110 as well.

The set of electrical probe points P attached to the sensor 110 is used to gather information from desired locations along the length of the sensor 110. Interaction between the system control center 118, the transmitter unit 122, and the sensor 110 is provided via communications logic 140. A visualization unit ("VU") may be connected to the communications logic 140 to monitor and display data that has been acquired (e.g., the values $V_1, V_2, \ldots, V_N$; or processed versions thereof). In some embodiments, an operator may intervene to modify the operation of the system 102 based on this displayed data.

The system control center 118 also interacts with data processing units ("DPUs") and data acquisition units ("DAUs"). DPUs may convert received acoustic information to velocity data and may enable displaying the results to the operator using the VU. The system control center 118 can be located at the surface 166. It may also be located below the surface 166 or in the borehole, in which case processed data is communicated to the surface 166, perhaps to a workstation 156 via a transmitter 124.

A memory 150, located inside or outside the housing 104, can be used to store data values acquired from the probe points P, and/or processing results (e.g., perhaps in a database 134). The memory 150 is communicatively coupled to the processor(s) 130, and may therefore be located down hole, or above the surface 166 of the formation 114.

A variety of configurations can be used for the sensor 110. Generally, the sensor 110 used in various embodiments is an elastic device that is sensitive to acoustic pressure variations across its length. Thus, multiple probe points P connected to a single moving part are able to measure this type of pressure variation. Sensors 110 comprising one (e.g., as part of apparatus 100'), two (e.g., as part of apparatus 100'') and four (e.g., as part of apparatus 100''') moving parts are illustrated in FIG. 1. The latter two of these arrangements (apparatus 100'', 100''') are more sensitive in an azimuthal direction around the housing 104, than when a single sensor 110 is used (e.g., as part of apparatus 100'). A housing 104 may be constructed with the apparatus 100 comprising one or more pads of piezoelectric materials attached to the housing 104, the pads used to make up individual ones of the sensors 110.

To measure the acoustic signal arriving at the housing 104, N probe points P are connected to a single moving part—the sensor 110. One leg of the probe is attached to a point P that is relatively insensitive to environmental acoustic pressure (e.g., in apparatus 100', the inside surface of the hollow cylinder), thus serving as a reference point, while the other leg is attached to a point P at the sensor surface (e.g., in apparatus 100', the outside surface of the hollow cylinder), to provide substantially greater exposure to acoustic pressure waves surrounding the housing 104.

The surfaces of the sensors 110 may be attached to many conductors, via the probe points P, such that the measured voltages or currents comprise averages across the contour of the respective sensor surfaces. As the sensor 110 changes its volume with varying acoustic pressure, voltage or current readings will change accordingly. The readings at each probe point P will be affected by the acoustic pressure at that point. However, since the material making up the sensor 110 is a single, integral piece, and because it comprises a secondary waveform propagation channel, the measurements at each point P may depend, to a greater or lesser degree, on each other. Even so, it may be possible to decrease the sensor body mode (and the resulting correlation between sampling probe points P), by using a highly elastic material to construct the sensor 110. The correlation of measurements across the sensor surface due to geometric spreading may be reduced by decreasing the width of the elastic material. Finally, as mentioned previously, an inversion algorithm that helps remove sensor body effects may also be applied.

Apparatus 100' is a monopole type tool, where the voltage reading from the probe points P is an average of the acoustic signal around the tool. The apparatus 100'' and 100''' are tools with multiple moving parts (i.e., two moving parts for apparatus 100'', and four moving parts for apparatus 100'''). For apparatus 100'', it is assumed that two different probe points P are used to measure sensor output values (e.g., currents or voltages) at substantially diametrically opposed locations on the circumference of the housing 104. By adjusting the phases of the moving parts (e.g., sensors 110 in apparatus 100''), a monopole type tool may be obtained where, for example, the measured voltage V is equal to $V_1+V_2$. Similarly, a dipole type tool can be obtained by subtracting these two voltages, such that $V=V_1-V_2$. This phase adjustment may be accomplished electronically, perhaps managed by the processor 130.

Quadrupole and higher order tools may be obtained similarly by connecting probes to additional parts (e.g., sensors 110 in the apparatus 100'''). Thus, for apparatus 100''', two pairs of different probe points P are used to measure sensor output values (e.g., currents or voltages) at substantially diametrically opposed locations on the circumference of the housing 104, along the length of the sensors 110. This is in contrast to the single pairs of measurement sets provided by the arrangement of apparatus 100", along the sensors 110.

In some embodiments, the distance between the transmitter unit 122 and the sensor(s) 110 is long enough to separate the anticipated different acoustic wave modes. However, very long distances contribute to unnecessary attenuation and distortion of the signals, and/or increased noise.

In some embodiments, an apparatus 100 comprises one or more elongated, unitary acoustic sensors 110, with multiple mechanical-to-electrical conversion probe points P along the length of the sensor 110. The probe points P provide corresponding multiple output values (e.g., voltage or current values $V_1, V_2, \ldots, V_N$) proportional to mechanical movement along the length of the sensor 110. Acoustic waves traveling in the primary propagation medium, typically the formation 114 and fluid in the borehole, are used to induce mechanical movement into the sensors 110, operating as a secondary propagation medium in contact with the primary propagation medium. It is the secondary propagation of the acoustic waves within the sensors 110 that provides the mechanical movement of the sensors 110.

The apparatus 100 may further comprise a processor 130 configured to process the output values (e.g., voltage or current values $V_1, V_2, \ldots, V_N$) to determine slowness in an acoustic wave propagating between at least two of the probe points P; these points may be adjacent points.

In some embodiments, the sensor 110 may take the form of a cylinder (e.g., in apparatus 100'), a cube, a rectangular block, or an elongated, multi-sided solid (e.g., a cylindrical hexagon). Thus, the sensor 110 may comprise a cylinder. The probe points P may comprise electrical contacts coupled to inner and outer surfaces of a hollow cylinder in some cases.

In some embodiments, the sensor 110 can be made of piezoelectric material, or a composite of piezoelectric material and rubber. The length of the sensor 110 along the longitudinal axis Z of the housing 104 might be as little as one-quarter of a meter, on up to many meters. Weights may be added to the sensor 110, or some other periodic variation in the structure made to change the elastic properties of the sensor 110. Thus, the sensor 110 may comprise a piezoelectric material, or a piezoelectric material and rubber combination.

The sensor 110 may comprise pairs of opposing solids, each member of the pair having multiple probe points. Thus, the sensors 110 in some embodiments may comprise at least one pair of substantially opposing solids, and wherein each one of the pair comprises a separate set of the probe points P (e.g., see apparatus 100"). Additional pairs may be added, perhaps forming a quadrupole (e.g., see apparatus 100''' that has two orthogonally-opposing pairs of sensors 110—the probe points P are not shown in this case, so as not to obscure the illustrated embodiment).

In some embodiments, a system 102 comprises one or more of the apparatus 100, as well as a housing 104. The housing 104 might take the form of a wireline tool body, or a down hole tool. The processor(s) 130 may accompany the sensor(s) 110, within the housing 104, or not.

A data transmitter may be used to transmit the acquired data values and/or processing results to the surface. Thus, the system 102 may comprise the data transmitter 124 (e.g., a telemetry transmitter) to transmit the acquired data values to a surface workstation 156.

Figure 2:
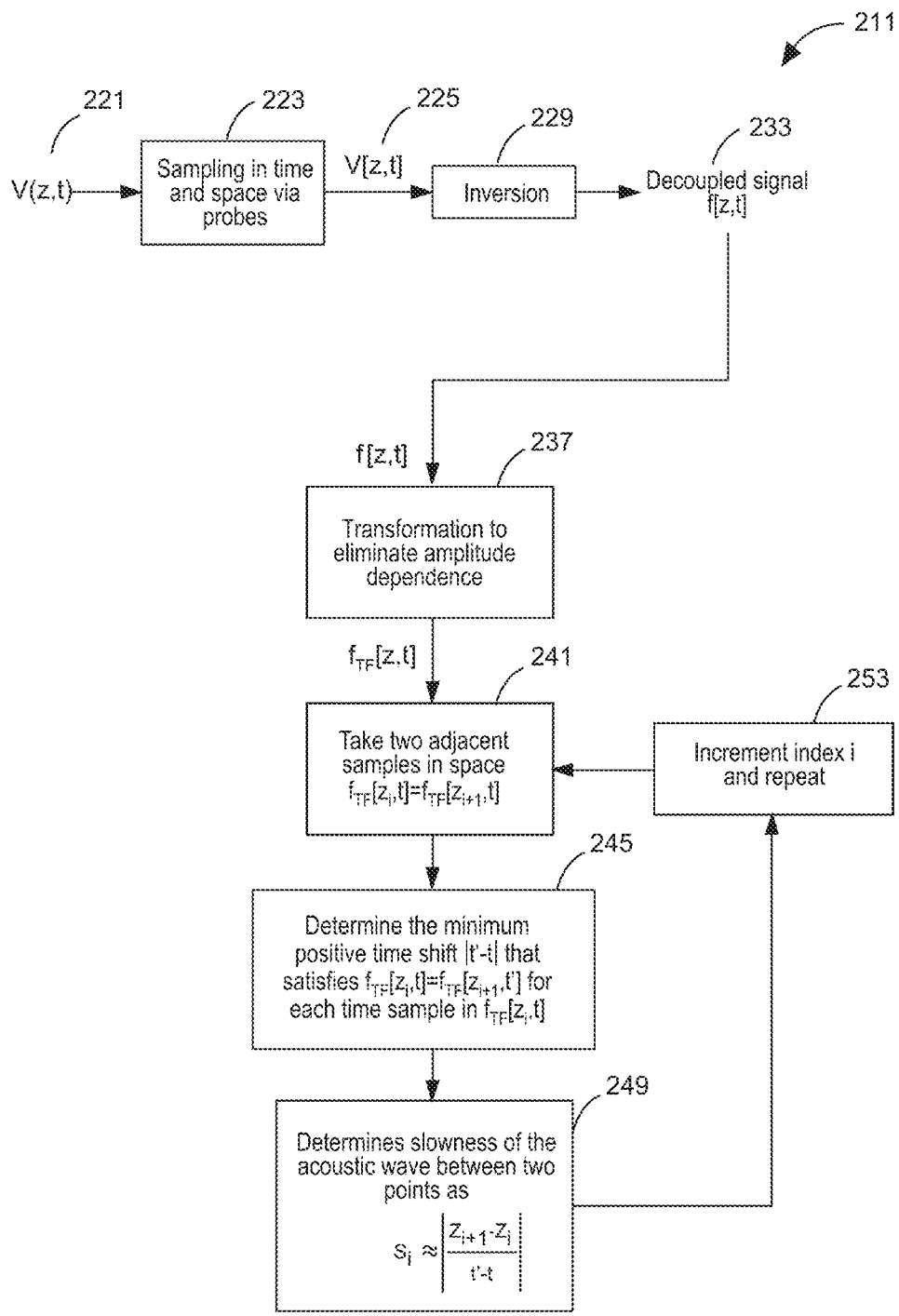
FIG. 2 is a flow chart illustrating several methods according to various embodiments of the invention.

FIG. 2 is a flow chart illustrating several methods 211 according to various embodiments of the invention. As it has been previously established, data values measured by a sensor may be affected by the sensor body, acting as a secondary propagation medium. Since a borehole acoustic tool is constructed for the purpose of making refracted wave measurements emanating directly from the borehole wall, better results are usually obtained when the effect of the sensor body is reduced, or removed. To accomplish this goal, an inversion algorithm can be used. The algorithm results may be further improved by adjusting material and design properties, as outlined above, to render values that are less correlated with each other.

In FIG. 2, a signal 221 provided by the sensor (e.g., sensor 110 in FIG. 1) is denoted by V(z,t), which is a continuous function of time and space. Probe points can be used to sample this signal at block 223, with the resulting sampled signal 225 shown as V[z,t]. The brackets in the sampled signal 225 are meant to describe a discrete function. An inversion algorithm is then applied at block 229 to obtain a decoupled, sampled signal 233, shown as f[z,t].

The inversion uses a forward model that is capable of simulating the signal 221 produced by the sensor for varying tool, environment, and acoustic source parameters. The forward model response is then matched with the measured signal. Due to inherent system and environmental noise, an exact match is not normally possible. Thus, the model and measurements are matched in a way that reduces or minimizes the error, generally in a least-squares sense.

Inversion can be accomplished in several different ways. For example, it can be done in an iterative manner by calling the forward model at each sample and updating the parameters used in the model according to the gradient of difference between the forward model results and the measurement. Another option is using a forward model that simulates a wide variety of parameters, storing the results in a database, and matching the measurement results with the results in the database. This latter approach requires a longer initial computational effort. Once the database is formed however, it may be possible to accomplish inversion much faster compared to the iterative method.

After inversion, any one of several processing methods may be used to analyze the resulting data. For example, a time semblance algorithm may benefit from using a relatively high sampling rate to provide accurate velocity images with little or no distortion due to aliasing. However, the application of a time semblance algorithm is computationally costly. A simpler alternative that uses the data from such a tool in a more effective manner can be used, and will now be described.

To begin, assume that the decoupled, sampled signal 233 is available at N number of points (corresponding to N probe points) for T time samples. N can be made an arbitrarily large number, such that the distance between the sampling points along the length of the sensor is relatively small with respect to the wavelengths encountered in acoustic waveforms (e.g., less than $0.1\lambda$, $0.05\lambda$, or $0.01\lambda$). Thus, it can be assumed that the wave amplitude is essentially unchanged between two sampling points. The number of time samples T should also be taken as large enough to guarantee that the all the desired information in the waveform is recorded, according to the Nyquist-Shannon sampling theorem.

Figure 3:
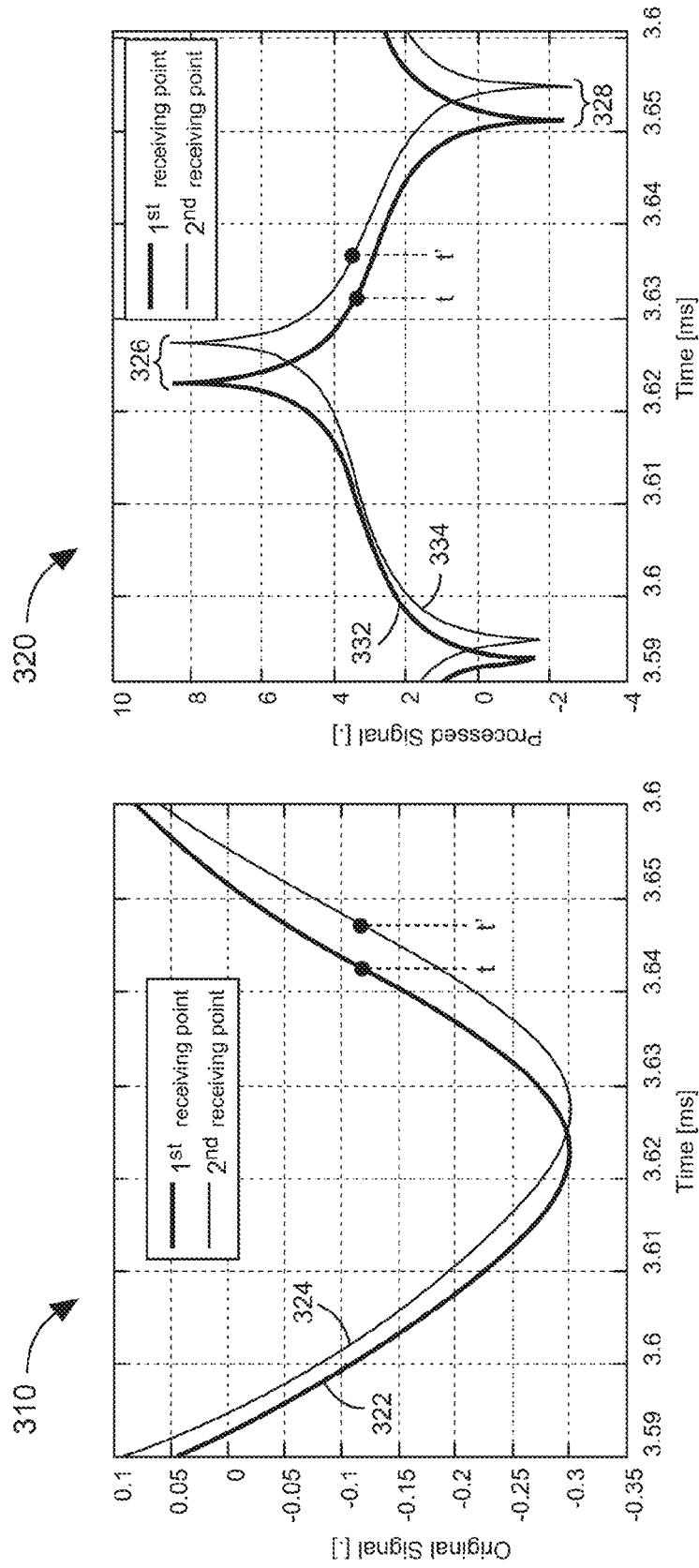
FIG. 3 illustrates graphs of sensor output values before and after the values are transformed to reduce amplitude variations.

FIG. 3 illustrates graphs 310, 320 of sensor output values before and after the values are transformed to reduce amplitude variations. In graph 310, a monopole acoustic waveform sampled at two adjacent probe point locations along a sensor constructed according to various embodiments is shown. The waveforms 322, 324 are taken from sampling probe points that are approximately 0.01 m apart, so that with respect to most practical acoustic signals, the waveform amplitude at each point is virtually same, except for the time-shift between the two points.

To better preserve the shape of the waveform between two sampling locations, a transformation may be applied to the acquired signal. For example, one may assume the sampled signal is denoted by $f[z_i, t]$ for location point i, and the derivative of this signal in time is denoted by $f'[z_i, t]$. One may also assume that $f[z_{i+1},t] \approx cf[z,t]$, where the distance between sampling location (i+1) and sampling location (i) is assumed to be small relative to the wavelength of the data. The variable c is a measure of the change of amplitude of the waveform over this small distance. From these assumptions, one may conclude that:

$$\frac{f[z_{i+1}, t]}{f'[z_{i+1}, t]} \approx \frac{cf[z_i, t]}{cf'[z_i, t]} = \frac{f[z_i, t]}{f'[z_i, t]}.$$

Amplitude variations can be reduced to a large degree by employing this kind of transformation, which is shown in graph 320. In some embodiments, this transformation action is skipped, or replaced with a similar transform that normalizes the amplitudes, such as exponential averaging. Thus, additional embodiments may be realized.

Referring now to FIGS. 2 and 3, it can be seen that examples of the signal at two relatively close sampling locations (e.g., 0.01 m apart) on the sensor before and after the employment of the described transformation at block 237 are shown in graphs 310 and 320, respectively. A slightly shifted version of the signal waveform 322 obtained at the first probe point position is obtained as a shifted waveform 324 at the second sampling probe point location. After applying the transformation at block 237, the amplitude of the first transformed waveform 332 is essentially unchanged by the time it reaches the second sampling probe point (as transformed waveform 334).

At block 241, two adjacent samples of the original waveforms 322, 324, or two adjacent samples of the transformed waveforms 332, 334 are identified. At block 245, the amount of time shift between the adjacent samples is determined. Here, the shift in time for each time sample of the waveform 332 acquired at the first receiving probe point can be more easily calculated by finding the closest point in time with the same amplitude on waveform 334, corresponding to data acquired at the second receiving probe point (e.g., the minimum value of |t'-t| that satisfies $f[z_{i+1},t']=f[z_i,t]$). It may turn out that the time of the waveform 334 acquired at the second receiving probe point location does not correspond to a specific time sample. In such cases, the time-shift can be found using simple interpolation.

Another difficulty may arise when matching time samples that occur close to maxima 326 and minima 328, where there is more ambiguity. In such cases, embodiments of the method 211 may operate to calculate an average time shift, or such points may simply be ignored.

At block 249, the resulting time-shift |t'-t| can be divided by the known distance between two sampling points along the sensor to obtain the change of slowness with respect to time between these two points for the specified time sample t. The operation can be repeated for additional time samples, incrementing the index of the sample at block 253. Note that the order of (i) and (i+1) is not important in the operation employed to find the amount of time shift.

Therefore, given the assumptions above, the method 211 can be used to obtain the formation velocity profile across the length of the sensor. The activities in FIG. 2 can be repeated for all sampling locations to obtain slowness as a function of location.

Slowness data can then be used in several different ways, as follows:

a) The radial velocity profile of the formation can be obtained by comparing the velocity information obtained at different sampling locations, since these sampling locations have differing radial depths of investigation due to the change in effective tool length at different sensor positions.

b) If the velocity profiles suggest a single formation layer surrounds the sensor, results of the velocities for different sampling points may be averaged, to reduce or eliminate the effects of ambient noise.

c) If the velocity profile suggests a change in formation properties, the boundaries of formation layers may be determined by comparing the velocity information over the length of the sensor.

The computational efficiency of the method 211 should now be apparent. The total number of computations is on the order of N×T, while the same computations using a more conventional time-semblance method are on the order of N×T×$N_s$, where $N_s$ denotes the number of slowness values that are calculated. That is, the method 211 has the potential to reduce the number of calculations to determine slowness in a formation by a factor of N. Additional embodiments may therefore be realized.

Figure 4:
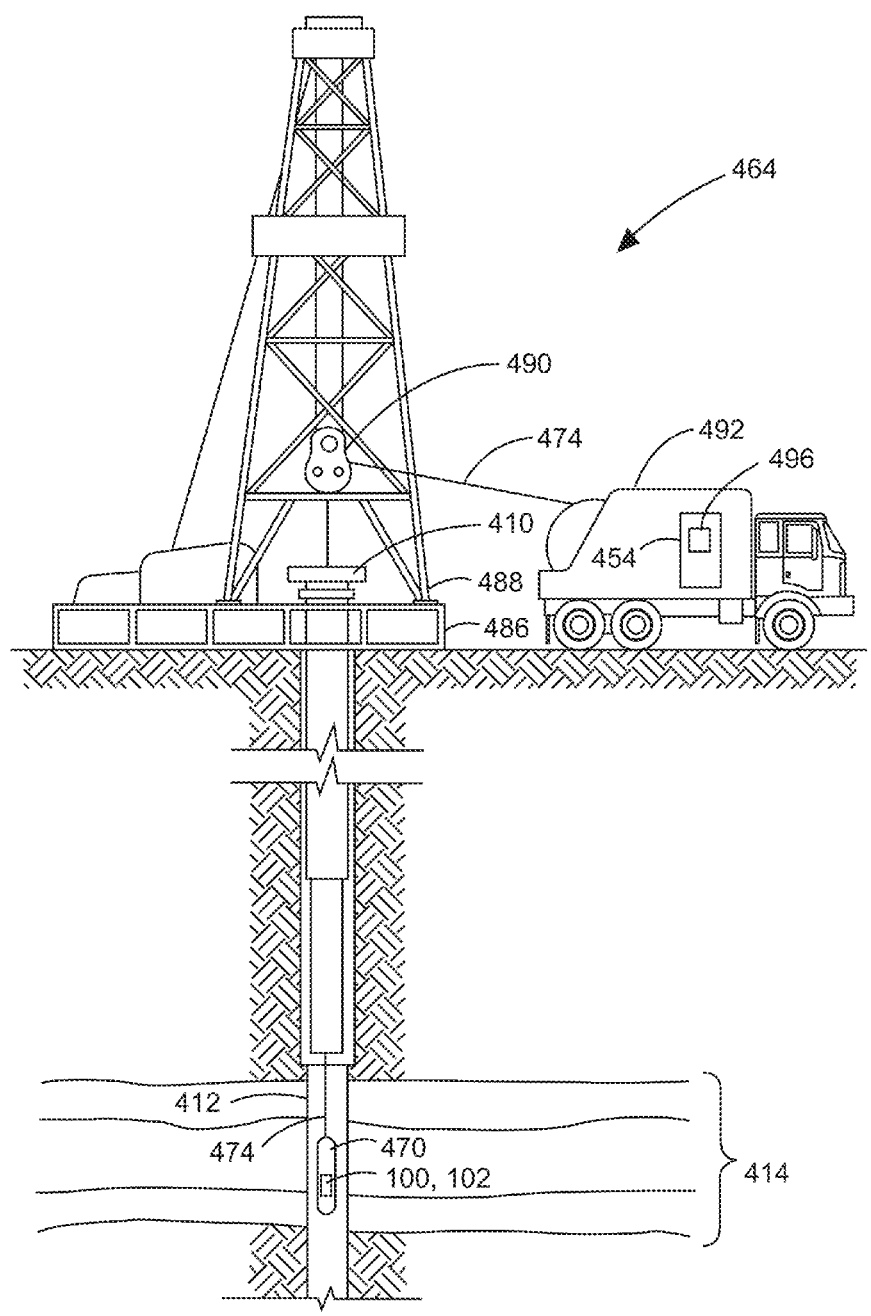
FIG. 4 illustrates a wireline system embodiment of the invention.
Figure 5:
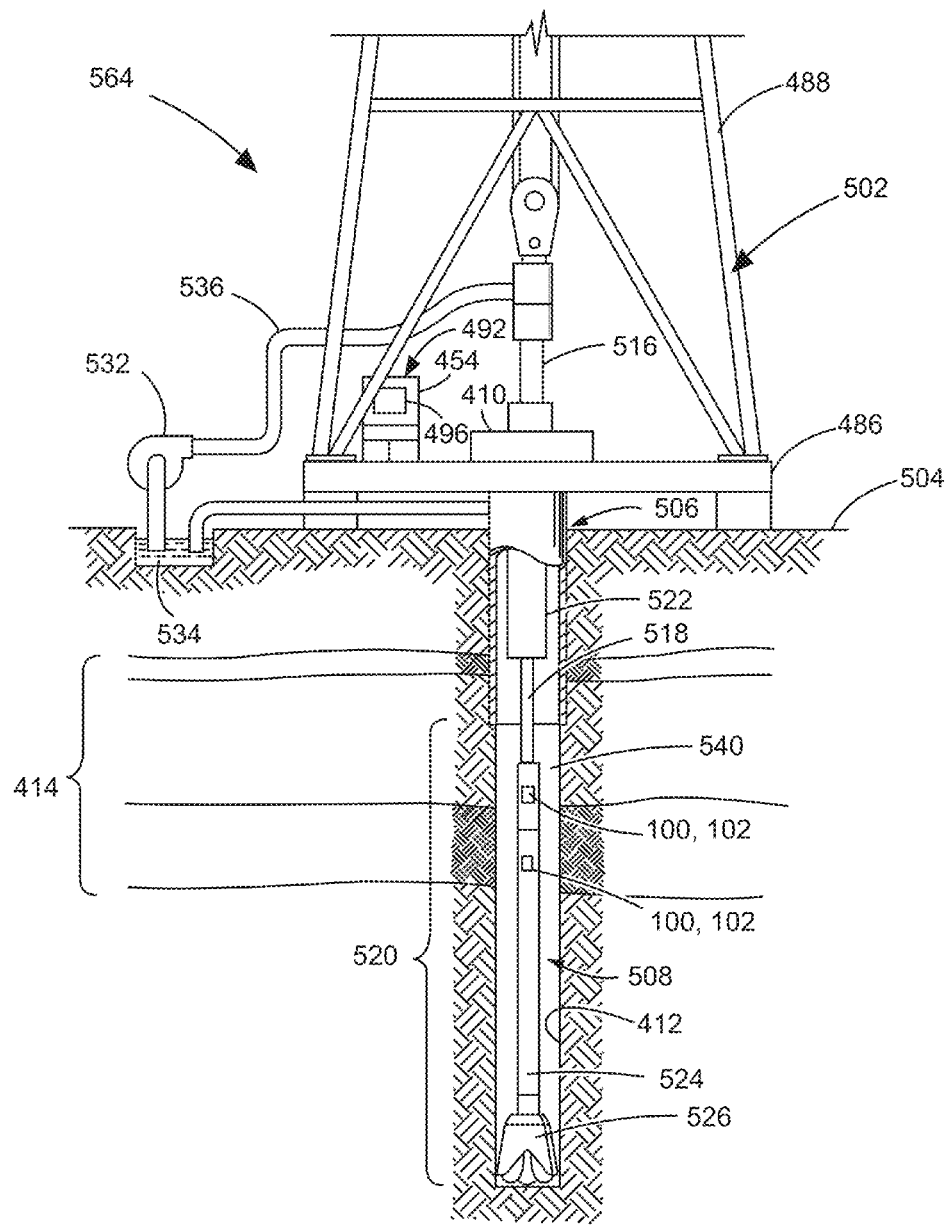
FIG. 5 illustrates a drilling rig system embodiment of the invention.

FIG. 4 illustrates a wireline system 464 embodiment of the invention, and FIG. 5 illustrates a drilling rig system 564 embodiment of the invention. Thus, the systems 464, 564 may comprise portions of a wireline logging tool body 470 as part of a wireline logging operation, or of a down hole tool 524 as part of a down hole drilling operation.

Thus, FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths the instruments (e.g., the apparatus 100, or system 102 shown in FIG. 1) included in the tool body 470 may be used to perform measurements on the subsurface geological formations 414 adjacent the borehole 412 (and the tool body 470). The measurement data can be communicated to a surface logging facility 492 for storage, processing, and analysis. The logging facility 492 may be provided with electronic equipment for various types of signal processing, which may be implemented by any one or more of the components of the apparatus 100 or system 102 in FIG. 1. Similar formation evaluation data may be gathered and analyzed during drilling operations (e.g., during LWD operations, and by extension, sampling while drilling).

In some embodiments, the tool body 470 comprises an acoustic tool for obtaining and analyzing acoustic noise measurements from a subterranean formation through a borehole. The tool is suspended in the wellbore by a wireline cable 474 that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1 and 4-5, it may be seen that in some embodiments, the systems 464, 564 may include a drill collar 522, a down hole tool 524, and/or a wireline logging tool body 470 to house one or more apparatus 100, similar to or identical to the apparatus 100 described above and illustrated in FIG. 1. Components of the system 102 in FIG. 1 may also be housed by the tool 524 or the tool body 470.

Thus, for the purposes of this document, the term "housing" may include any one or more of a drill collar 522, a down hole tool 524, or a wireline logging tool body 470 (all having an outer wall, to enclose or attach to instrumentation, sensors, fluid sampling devices, pressure measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present acoustic noise information, both measured and processed/calculated, as well as database information, perhaps in graphic form. A system 464, 564 may also include computation logic, perhaps as part of a surface logging facility 492, or a computer workstation 454, to receive signals from transmitters and receivers, and other instrumentation to determine properties of the formation 414.

Thus, a system 464, 564 may comprise a down hole tool body, such as a wireline logging tool body 470 or a down hole tool 524 (e.g., an LWD or MWD tool body), and an apparatus 100 attached to the tool body, the apparatus 100 to be constructed and operated as described previously.

The apparatus 100; systems 102, 464, 564; housing 104; sensors 110; control center 118; transmitter unit 122; data transmitter 124; processors 130; database 134; communications logic 140; memory 150; workstation 156; data acquisition units DAU; data processing units DPU; probe points P; visualization unit VU; rotary table 410; borehole 412; computer workstations 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; and hose 536 may all be characterized as "modules" herein.

Such modules may include hardware circuitry, and/or a processor and/or memory circuits, software program modules and objects, and/or firmware, and combinations thereof, as desired by the architect of the apparatus 100 and systems 102, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 102, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
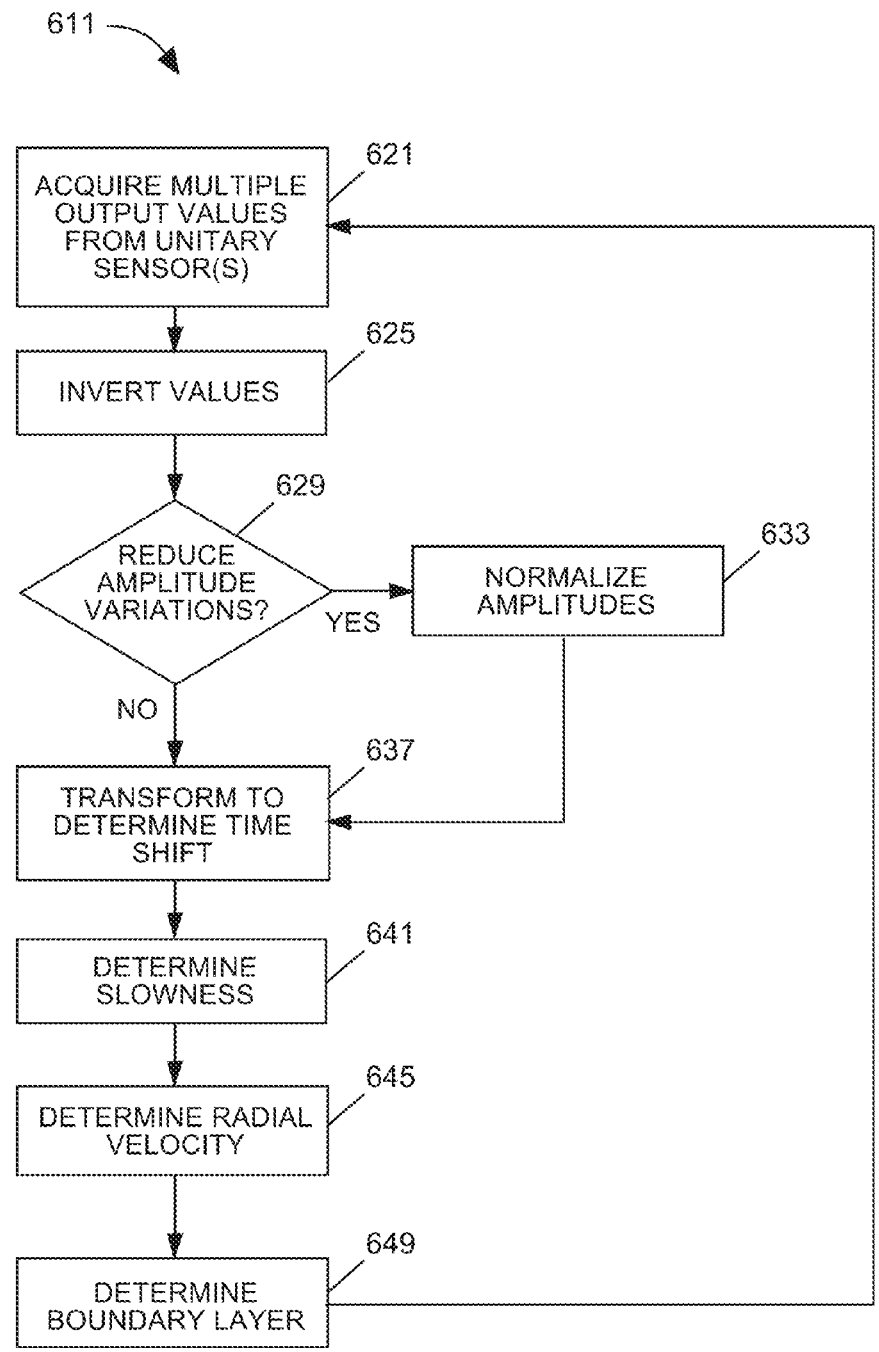
FIG. 6 is a flow chart illustrating several additional methods according to various embodiments of the invention.

For example, FIG. 6 is a flow chart illustrating several additional methods 611 according to various embodiments of the invention. In some embodiments, the methods 611 may include acquiring voltage or current output from an elongated acoustic sensor with multiple probe points, as output data for each point. This data is then processed to determine acoustic wave slowness for waves traveling in the sensor body.

Thus, a method 611 may begin at block 621 with acquiring multiple output values provided by at least one elongated, unitary acoustic sensor operating as a secondary propagation medium, where mechanical movement is induced in the sensor by acoustic waves propagating in a primary propagation medium, perhaps comprising a geological formation and fluid (e.g., drilling mud or other fluid) within the borehole. Multiple mechanical-to-electrical conversion probe points (at least three pairs of points P) are included along the length of the sensor to provide the multiple output values, which are proportional to the mechanical movement induced along the length of the sensor.

The sensor can be formed in many ways, including as a hollow cylinder. Thus, the activity at block 621 may comprise acquiring the multiple output values from the sensor comprising a hollow cylinder.

The sensor can also be formed as pairs of elongated solids, which may comprise sections of a hollow cylinder. Thus, the activity at block 621 may comprise acquiring the multiple output values from a sensor comprising at least one pair of substantially opposing elongate solids.

The raw output values provided by the sensor can be inverted to reduce sensor body effects. Thus, the method 611 may comprise, at block 625, inverting the output values to provide a decoupled sampled signal.

The decoupled sampled signal can be normalized, to reduce amplitude variations, helping to preserve the waveform shape between the sampling locations. Thus, if it is desirable to reduce amplitude variations, as determined at block 629, the method 611 may continue on to block 633 with transforming the decoupled sampled signal to provide a normalized version of the decoupled sampled signal, having normalized amplitudes.

The time shift between two adjacent probe points can be determined by finding the closest point in time with substantially the same amplitude. Thus, the method 611 may comprise transforming, at block 637, the decoupled sampled signal, or a normalized version of the decoupled sampled signal, to determine the time shift between the adjacent probe point output values.

Determining the time shift may comprise, for an output value corresponding to a first one of the probe points, locating a point in time for a second, proximate probe point (e.g., an adjacent probe point) output value that has an amplitude approximately equal to the amplitude associated with the output value corresponding to the first one of the probe points.

Interpolation can be used when the determined time shift doesn't match up precisely with one of the probe point output values. For example, the time shift between two normalized discrete signals at a given time $t_p$ may be calculated by (1) interpolating the first discrete signal $V_1[n]$ to obtain a continuous signal $V_1(t)$; (2) interpolating the second discrete signal $V_2[n]$ to obtain a continuous signal $V_2(t)$; (3) finding t such that $V_2(t)=V_1(t_p)$; and then (4) calculating the time shift as $t-t_p$. Thus, the activity at block 637 may comprise determining the time shift by interpolating arrival times between the output values obtained from adjacent probe points.

Maximal or minimal points in the transformed (normalized) output values may be difficult to process for time shift determination. In this case, averages can be used across minima or maxima. Such points can also be ignored. Thus, the activity at block 637 may comprise determining the time shift by either: calculating an average time shift, or ignoring the time shift for maximal and/or minimal magnitude values of the normalized amplitudes.

The method 611 may continue on to block 641 to include processing the output values to determine slowness in an acoustic wave propagating between two or more of the probe points. For example, slowness can be determined by dividing the time shift by the inter-probe distance. Thus, the activity at block 641 may comprise dividing the time shift by a distance along the length of the sensor between probe points corresponding to the data values being processed.

Noise in the calculated slowness can be reduced by averaging. As is recognized by those of ordinary skill in the art, slowness and velocity are reciprocals of each other. Thus, the activity at block 641 may comprise reducing noise in the slowness by averaging velocity information over a layer of the geological formation to reduce noise in the slowness.

Determining the slowness enables obtaining a radial velocity of the formation. Thus, the method may include, at block 645, determining the radial velocity of the geological formation, based on the slowness.

Examining velocity values in the slowness may enable determining layer boundaries. Thus, the method 611 may continue on to include, at block 649, comparing velocity values in the slowness, along the length of the sensor, to determine a layer boundary in the geological formation.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
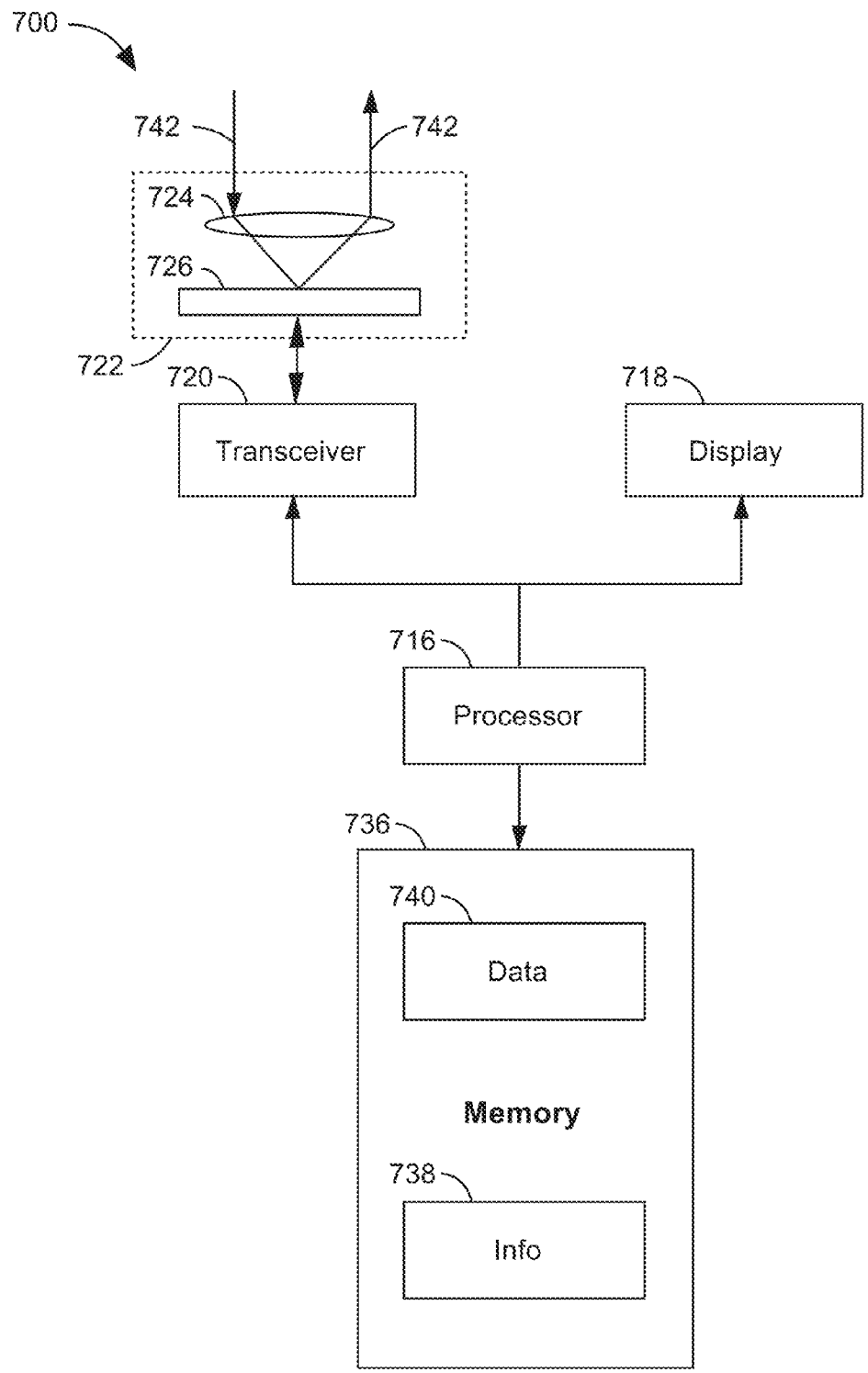
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 2 and 6, the apparatus of FIG. 1, and the systems of FIGS. 1, 4, and 5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 shown in FIG. 1. In some embodiments, the article 700 is similar to or identical to the apparatus 100 or system 102 shown in FIG. 1.

Figure 8:
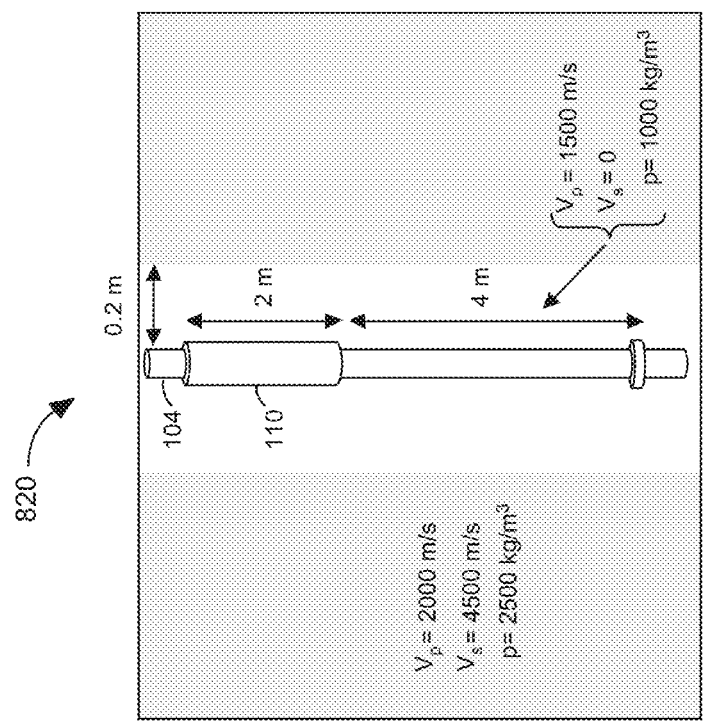
FIG. 8 is part of a simulation example that illustrates the geometry of down hole tools with conventional acoustic sensors, and with a sensor implemented according to various embodiments of the invention.
Figure 8:
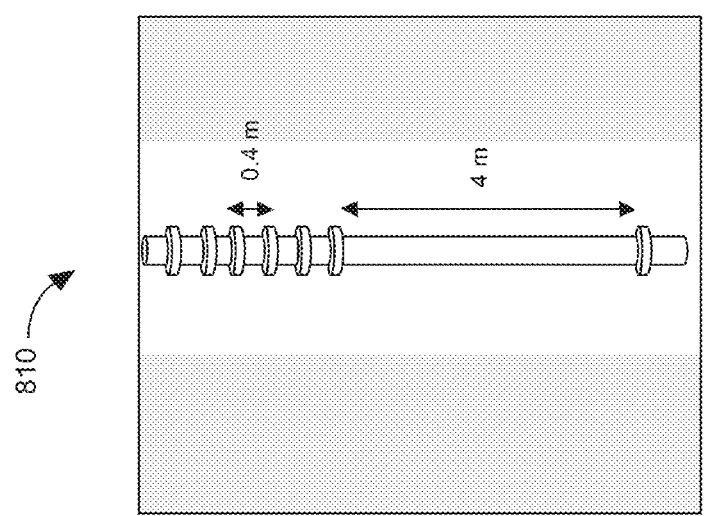

FIG. 8 is part of a simulation example that illustrates the geometry of down hole tools 810, 820 with conventional acoustic sensors, and with a unitary sensor 110 implemented according to various embodiments of the invention, respectively. To demonstrate the advantages that might be obtained by using some of the mechanisms described herein, as compared to conventional approaches, an example use case is simulated, with the geometries shown in the figure. The simulation assumes a single formation layer with compressional velocity ($V_p$) equal to 2000 m/s, shear velocity ($V_s$) equal to 4500 m/s, and a density ($\rho$) equal to 2500 kg/m$^3$. In each case, the tool is placed in a borehole with a borehole radius of 0.2 m, a mud compressional velocity of 1500 m/s, and a mud density of 1000 kg/m$^3$.

In the case of the conventional tool 810, six discrete sensors are placed about 0.4 m apart, with the closest one located about 4 m away from the transmitter. Sampling thus occurs at six locations.

The tool 820 that includes a unitary sensor constructed according to the information provided herein, has a sensor length of 2 m, with the transmitter-to-sensor distance also being 4 m at the closest point. Sampling occurs at over two-hundred locations, at probe points spaced approximately equally apart along the length of the sensor.

In the simulation, the transmitted acoustic pulse is a Ricker-type pulse with an 8 kHz central frequency. Results for both monopole and dipole type tools are simulated.

Figure 9:
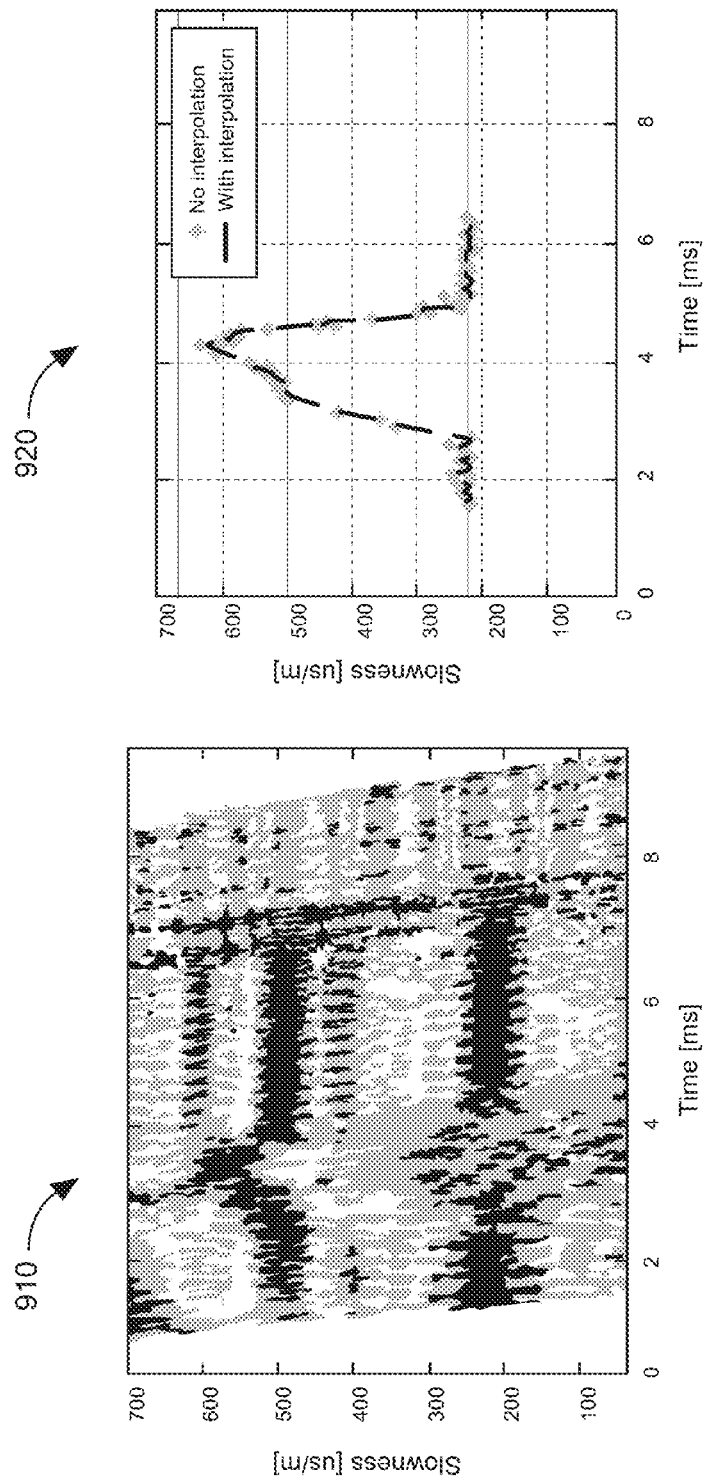
FIG. 9 is another part of the simulation example that illustrates time semblance processing results for a conventional monopole sensor arrangement, and with a monopole sensor implemented according to various embodiments of the invention.

FIG. 9 is another part of the simulation example that illustrates time semblance processing results for a conventional monopole sensor arrangement and for a monopole sensor implemented according to various embodiments of the invention. Here, a point-by-point time semblance algorithm with envelope detection was used to process the data provided by a conventional monopole tool (e.g., tool 810 in FIG. 8), to produce the graph 910. Formation compressional slowness, formational shear slowness, and mud compressional slowness are indicated as shades of gray, going from darker to lighter, respectively. Darker points indicate regions of stronger semblance. However, the results are significantly corrupted due to aliasing and the harmonics of the acquired signal, which make it relatively difficult to correctly interpret the results.

In fact, it can be shown that aliases occur at $$s_{alias} = \frac{m}{f \Delta z} + s_{signal}, m \in Z, m \neq 0;$$

where $s_{signal}$ is the real slowness of the acoustic wave, $s_{alias}$ is the aliased slowness, $\Delta z$ is the separation between sensors, and f is the signal frequency. Hence, as the separation between the sensors decreases, the aliased data will move farther away from the true slowness indications.

Graph 920 shows the simulation results that might be expected when a unitary sensor with multiple probe points is implemented as described herein (e.g., tool 820 in FIG. 8), along with the processing of methods shown in FIGS. 2 and/or 6. Since this simulation makes use of a uniform formation layer, slowness results can be averaged across the sampling locations.

The results in graph 920 substantially match the time semblance results demonstrated in graph 910, without the corruption due to aliasing. Compressional, shear, and Rayleigh type waves can be clearly seen. While semblance methods may also be used with data acquired using the inventive embodiments, computational costs are higher.

Figure 10:
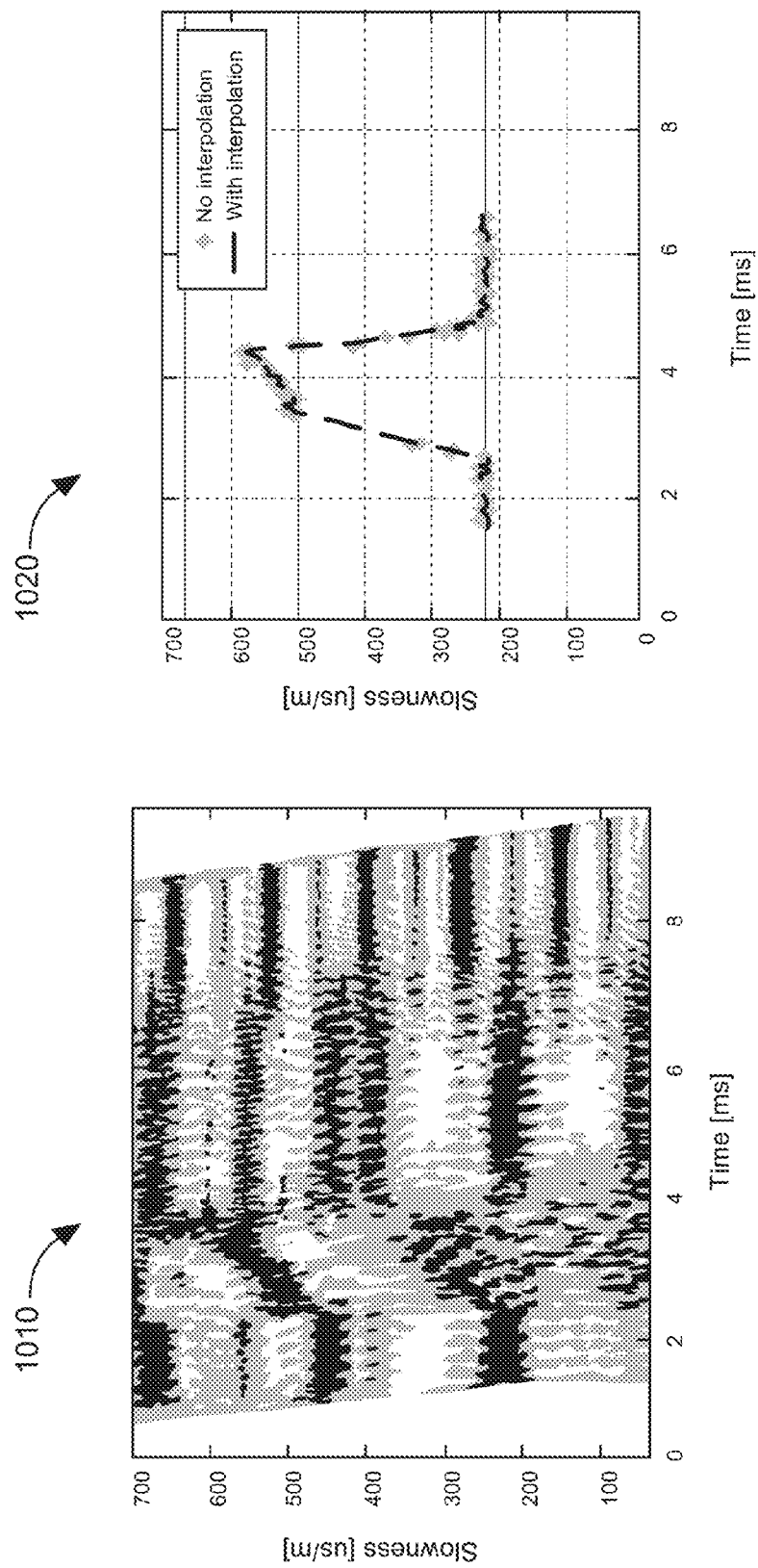
FIG. 10 is the final part of the simulation example that illustrates time semblance processing results for a conventional dipole sensor arrangement, and with a dipole sensor implemented according to various embodiments of the invention.

FIG. 10 is the final part of the simulation example that illustrates time semblance processing results for a conventional dipole sensor arrangement, and with a dipole sensor implemented according to various embodiments of the invention. Here, the graph 1010 is obtained by engaging a point-by-point time semblance algorithm with envelope detection, for data acquired using a conventional dipole tool (e.g., tool 810 in FIG. 8). Formation compressional slowness, formational shear slowness, and mud compressional slowness are indicated as black, gray, and white areas, going from darker to lighter, respectively. Again, the results are significantly corrupted due to aliasing and the harmonics of the signal.

As a matter of contrast, the graph 1020 shows the simulation results that might be expected when unitary sensors with multiple probe points are implemented as described herein (e.g., tool 820 in FIG. 8), along with the processing of methods shown in FIGS. 2 and/or 6. Slowness results were again averaged across the sampling locations, and the results in graph 1020 are seen to substantially match the time semblance results demonstrated in graph 1010. Once again, compressional, shear, and Rayleigh type waves can be seen clearly, without significant corruption due to aliasing.

In summary, using the apparatus, systems, and methods disclosed herein may provide the ability to resolve formation properties in space, with aliasing reduced or eliminated, to provide more accurate velocity information. A radial velocity profile may be obtained to enable more accurate determination of layers and layer boundaries. Since the proposed sensor embodiments serve to reduce the number of moving parts in an acoustic tool, such construction may also reduce manufacturing costs. The signal processing techniques described herein may also provide formation velocity information with greater efficiency. A combination of these advantages can significantly enhance the value of the services provided by an operation/exploration company, while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method, comprising:
acquiring multiple output values from mechanical-to-electrical conversion provided by at least one elongated, unitary acoustic sensor operating as a secondary propagation medium with multiple probe points along a length of the at least one elongated, unitary acoustic sensor to provide the multiple output values proportional to mechanical movement along the length of the at least one elongated, unitary acoustic sensor, the output values being electrical values of voltage or current from the at least one elongated, unitary acoustic sensor at respective locations along the length of the at least one elongated, unitary acoustic sensor, the mechanical movement being induced by acoustic waves in a primary propagation medium comprising a geological formation and borehole fluid, an elongated, unitary acoustic sensor being an undivided sensor of single, continuous material, the undivided sensor capable of carrying an received acoustic wave along its length in an uninterrupted fashion such that mechanical movement of the undivided sensor along the length of the undivided sensor occurs in response to the received acoustic wave being carried across the length of the undivided sensor; and
processing the output values to determine slowness in an acoustic wave propagating between at least two of the probe points.

2. The method of claim 1, wherein the processing further comprises:
inverting the output values to provide a decoupled sampled signal.

3. The method of claim 2, further comprising:
transforming the decoupled sampled signal to provide a normalized version of the decoupled sampled signal having normalized amplitudes.

4. The method of claim 2, further comprising:
transforming the decoupled sampled signal, or a normalized version of the decoupled sampled signal to determine a time shift between the output values.

5. The method of claim 4, wherein determining the time shift comprises interpolating arrival times between the output values.

6. The method of claim 4, wherein determining the time shift comprises one of calculating an average time shift or ignoring the time shift for maximal or minimal magnitude values of the normalized amplitudes.

7. The method of claim 4, wherein determining the time shift comprises, for an output value corresponding to one of the probe points, locating a point in time for an adjacent probe output value that has an amplitude approximately equal to an amplitude associated with the output value corresponding to the one of the probe points.

8. The method of claim 4, wherein determining the slowness comprises:
dividing the time shift by a distance along the length of the at least one elongated, unitary sensor between corresponding ones of the probe points.

9. The method of claim 1, further comprising:
determining a radial velocity of the geological formation, based on the slowness.

10. The method of claim 1, further comprising:
reducing noise in the slowness by averaging velocity information over a layer of the geological formation to reduce noise in the slowness.

11. The method of claim 1, further comprising:
comparing velocity values in the slowness, along the length of the at least one elongated, unitary sensor, to determine a layer boundary in the geological formation.

12. The method of claim 1, wherein the acquiring comprises:
acquiring the multiple output values from the at least one elongated, unitary sensor comprising a hollow cylinder.

13. The method of claim 1, wherein the acquiring comprises:
acquiring the multiple output values from the at least one elongated, unitary acoustic sensor comprising at least one pair of substantially opposing elongate solids.

14. An apparatus, comprising:
at least one elongated, unitary acoustic sensor to operate as a secondary propagation medium with multiple probe points along a length of the at least one elongated, unitary acoustic sensor to provide corresponding multiple output values from mechanical-to-electrical conversion proportional to mechanical movement along the length of the at least one elongated, unitary acoustic sensor, when the mechanical movement is induced by acoustic waves in a primary propagation medium, the output values being electrical values of voltage or current from the at least one elongated, unitary acoustic sensor at respective locations along the length of the at least one elongated, unitary acoustic sensor, wherein an elongated, unitary acoustic sensor is an undivided sensor of single, continuous material, the undivided sensor capable of carrying an received acoustic wave along its length in an uninterrupted fashion such that mechanical movement of the undivided sensor along the length of the undivided sensor occurs in response to the received acoustic wave being carried across the length of the undivided sensor; and a processor configured to determine slowness in an acoustic wave propagating between at least two of the probe points, based at least in part on the output values.

15. The apparatus of claim 14, wherein the at least one elongated, unitary sensor comprises a cylinder.

16. The apparatus of claim 14, wherein the at least one elongated, unitary sensor comprises a piezoelectric material or piezoelectric material and rubber combination.

17. The apparatus of claim 14, wherein the at least one elongated, unitary sensor comprises at least one pair of substantially opposing solids, and wherein each one of the pair comprises a separate set of the probe points.

18. A system, comprising:
a housing; and
an apparatus attached to the housing, the apparatus comprising at least one elongated, unitary acoustic sensor to operate as a secondary propagation medium with multiple probe points along a length of the at least one elongated, unitary acoustic sensor to provide corresponding multiple output values from mechanical-to-electrical conversion proportional to mechanical movement along the length of the at least one elongated, unitary acoustic sensor when the mechanical movement is induced by acoustic waves in a primary propagation medium, the output values being electrical values of voltage or current from the at least one elongated, unitary acoustic sensor at respective locations along the length of the at least one elongated, unitary acoustic sensor, an elongated, unitary acoustic sensor being an undivided sensor of single, continuous material, the undivided sensor capable of carrying an received acoustic wave along its length of the undivided sensor occurs in response to the received acoustic wave being carried across the length of the undivided sensor, and a processor configured to determine slowness in an acoustic wave between at least two of the probe points, based at least in part on the output values.

19. The system of claim 18, wherein the housing comprises:
one of a wireline tool body, a measurement while drilling down hole tool, or a logging while drilling down hole tool.

20. The system of claim 18, wherein the probe points comprise electrical contacts coupled to inner and outer surfaces of a hollow cylinder.

* * * * *